United States Patent
Min

(10) Patent No.: US 6,954,364 B2
(45) Date of Patent: Oct. 11, 2005

(54) BACKLIGHT INVERTER FOR LIQUID CRYSTAL DISPLAY PANEL WITH SELF-PROTECTION FUNCTION

(75) Inventor: Byoung Own Min, Suwon (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 101 days.

(21) Appl. No.: 10/631,868

(22) Filed: Aug. 1, 2003

(65) Prior Publication Data

US 2004/0240235 A1 Dec. 2, 2004

(30) Foreign Application Priority Data

May 28, 2003 (KR) .................................. 10-2003-0033970

(51) Int. Cl.$^7$ ............................................. H02H 7/122
(52) U.S. Cl. ...................... 363/56.08; 315/255; 315/277
(58) Field of Search .............................. 363/22–26, 97, 363/133, 134, 50, 55, 56.01, 56.05, 56.06, 56.08; 315/121, 127, 209 R, 255, 277, 307

(56) References Cited

U.S. PATENT DOCUMENTS

| | | | | |
|---|---|---|---|---|
| 4,344,122 A | * | 8/1982 | Jones | ........................... 363/23 |
| 6,181,066 B1 | * | 1/2001 | Adamson | ..................... 315/282 |
| 6,259,615 B1 | | 7/2001 | Lin | |
| 6,359,391 B1 | * | 3/2002 | Li | .............................. 315/291 |
| 6,570,334 B2 | * | 5/2003 | Kastner | ...................... 315/119 |

* cited by examiner

*Primary Examiner*—Gary L Laxton
(74) *Attorney, Agent, or Firm*—Lowe Hauptman & Berner, LLP

(57) ABSTRACT

A backlight inverter for an LCD panel which is capable of detecting a fault in a transformer device or an open-lamp condition and performing a control operation to stop its operation upon detecting the fault in the transformer device or the open-lamp condition. The inverter supplies a PWM signal through a switch in normal operation. The inverter also detects a voltage corresponding to current flowing through each lamp in a lamp device and determines from the detected voltage whether the open-lamp condition has occurred. The inverter further detects a voltage at a midpoint of secondary windings of the transformer device and determines from the detected voltage whether the fault exists in the transformer device. In the event of the open-lamp condition or the fault in the transformer device, the inverter turns off the switch.

17 Claims, 8 Drawing Sheets

BACKLIGHT INVERTER FOR LIQUID CRYSTAL DISPLAY PANEL WITH SELF-PROTECTION FUNCTION

BACKGROUND OF THE INVENTION

1. Field of the Invention

The present invention relates to a backlight inverter for a thin film transistor-liquid crystal display (TFT-LCD) panel, and more particularly to a backlight inverter for an LCD panel which is capable of detecting a fault in a transformer device including two transformers driven in tandem or an open-lamp condition and performing a control operation to stop its operation upon detecting the fault in the transformer device or the open-lamp condition, so that an enhanced self-protection function can be carried out in the event of a malfunction, such as the fault in the transformer device or the open-lamp condition, to more securely prevent the internal components and circuits of the inverter from being damaged due to such a malfunction.

2. Description of the Related Art

In general, cold cathode fluorescent lamps (CCFLs) are operated at low current, resulting in advantages such as low power consumption, low heat, high brightness and long life. In this regard, the CCFLs have recently been used in various display devices such as a backlight unit of a computer monitor, for example, a TFT-LCD, and a display panel of a printer. A high alternating current (AC) voltage of 1 to 2 kV is required to light such a CCFL, and an inverter is utilized to provide such a high AC voltage.

The inverter can be generally classified into two types, a single type (or a single-stage type) where one transformer is driven by one driver and a double type (or a two-stage type) where two transformers are driven in tandem by one driver. In the case of the double-type inverter, a transformer device including the two transformers is adapted to operate two lamps in tandem with an AC voltage and a complementary AC voltage having a phase difference of 180 degrees therebetween, respectively.

FIG. 1 is a block diagram showing the construction of a general backlight inverter for an LCD panel. As shown in this drawing, the general backlight inverter comprises a switching device 11 for converting a direct current (DC) voltage of about 5 to 30V into a square-wave voltage in response to a pulse width modulation (PWM) signal, a rectifier 12 for rectifying an output voltage from the switching device 11 by half wave, a transformer driver 13 for converting an output voltage from the rectifier 12 into an AC voltage, a transformer device 14 for boosting an output AC voltage from the transformer driver 13 to a voltage level of about 1 to 2 kV necessary to a lamp operation, a lamp 15 connected to the transformer device 14 such that it is turned on/off in response to an output voltage from the transformer device 14, a feedback voltage detector 16 for detecting a voltage corresponding to current flowing through the lamp 15, and a dimming controller 17 for generating the PWM signal based on the voltage detected by the feedback voltage detector 16 and providing it to the switching device 11 to adjust a duty cycle of the square-wave voltage. The transformer driver 13 can be of any drive type based on a given circuit configuration.

This backlight inverter for the LCD panel is disadvantageous in that an over-voltage may be generated upstream of the transformer device or therein for various reasons when in use, causing damage to the internal components and circuits of the inverter. For example, in the case where the lamp is completely open, no current flows therethrough, so an over-voltage is generated upstream of the transformer device. Moreover, the lamp may be incompletely connected due to a poor connection of the peripheral components of the transformer device, resulting in a corona phenomenon where a spark discharge occurs due to an instantaneously high voltage in the transformer device itself. This corona phenomenon potentially involves the danger of fire.

In order to overcome the above problems, there have recently been proposed various backlight inverters for LCD panels, one example of which is disclosed in U.S. Pat. No. 6,259,615 and shown in FIG. 2 herein.

FIG. 2 is a circuit diagram showing the construction of a conventional backlight inverter for an LCD panel.

With reference to FIG. 2, the conventional backlight inverter comprises a transformer TX1, a power source 21, a bias/reference voltage generator 23 for generating a bias/reference voltage necessary to the internal operation of the inverter from the power source 21, and a switching device 28 for switching a voltage V1 from the power source 21 in response to a drive signal to provide a current path in the transformer TX1. To this end, the switching device 28 is composed of four transistors Switch_A to Switch_D. The conventional backlight inverter further comprises an LCD panel 22 including a CCFL operated by the transformer TX1, a protection circuit 26 for detecting an output voltage OVP from the transformer TX1 and providing a sweeping stop signal if the detected output voltage exceeds a reference voltage, and a frequency sweeper 27 for generating a 50% duty-cycle square-wave pulse by performing a frequency sweeping operation until the sweeping stop signal is provided from the protection circuit 26, namely, the output voltage OVP from the transformer TX1 exceeds the reference voltage. The conventional backlight inverter further comprises a feedback controller 24 for comparing a feedback voltage from the protection circuit 26 with a reference voltage and controlling an ON time of the switching device 28 in accordance with the compared result, and a driver circuit 25 for generating the drive signal in response to an ON-time control signal from the feedback controller 24 and the square-wave pulse from the frequency sweeper 27 and providing it to the switching device 28.

The protection circuit 26 includes a comparator 26A for comparing a voltage detected from the LCD panel 22 with a CMP voltage (reference voltage) and, if the detected voltage is above the CMP voltage, recognizing an open-lamp condition and providing the sweeping stop signal to the frequency sweeper 27, a timer 26B for initiating a time-out sequence once the detected voltage exceeds the reference voltage and allowing the comparator 26A to provide the stop signal once the time-out is reached, and a current sensor 26C for detecting current corresponding to the open-lamp condition to turn off the frequency sweeper 27.

The conventional backlight inverter for the LCD panel with the above-mentioned construction is desirable to protect the internal circuits from an over-voltage in the open-lamp condition, but has a disadvantage in that it cannot detect a fault in the transformer itself and, in particular, cannot propose any solution to a fault in a transformer device including two transformers driven in tandem, resulting from an internal or external poor connection of the transformer device.

In other words, in the case of the double-type inverter where two transformers are driven in tandem, a corona phenomenon may occur due to a poor connection of the peripheral components of the transformer device, which may cause damage to the inverter components and circuits. In a serious case, a strong spark in the transformer device may result in the occurrence of a fire.

SUMMARY OF THE INVENTION

Therefore, the present invention has been made in view of the above problems, and it is an object of the present invention to provide a backlight inverter for an LCD panel which is capable of detecting a fault in a transformer device including two transformers driven in tandem or an open-lamp condition and performing a control operation to stop its operation upon detecting the fault in the transformer device or the open-lamp condition, so that an enhanced self-protection function can be carried out in the event of a malfunction, such as the fault in the transformer device or the open-lamp condition, to more securely prevent the internal components and circuits of the inverter from being damaged due to such a malfunction.

In accordance with one aspect of the present invention, the above and other objects can be accomplished by the provision of a backlight inverter for an LCD panel which drives transformers in pairs, comprising a switch for switching a direct current (DC) operating voltage in response to a pulse width modulation (PWM) drive signal; a rectifier for rectifying an output voltage from the switch; a transformer driver for converting an output voltage from the rectifier into an alternating current (AC) voltage; transformer means for boosting an output AC voltage from the transformer driver to levels of a lamp operating voltage and a complementary lamp operating voltage, the transformer means including a plurality of transformers connected in parallel to the transformer driver and driven in pairs; lamp means including a plurality of lamps, each of the lamps being operated by a corresponding one of the transformers of the transformer means; operation stop control means for detecting a voltage at a midpoint of secondary windings of each of the transformer pairs in the transformer means, determining from the detected voltage whether a fault exists in the transformer means and outputting an operation stop signal upon determining that the fault exists in the transformer means; and an output driver for supplying the PWM drive signal to the switch in normal operation and a switch-off signal to the switch upon receiving the operation stop signal from the operation stop control means, respectively.

In accordance with another aspect of the present invention, there is provided a backlight inverter for an LCD panel which drives transformers in pairs, comprising a switch for switching a DC operating voltage in response to a PWM drive signal; a rectifier for rectifying an output voltage from the switch; a transformer driver for converting an output voltage from the rectifier into an AC voltage; transformer means for boosting an output AC voltage from the transformer driver to levels of a lamp operating voltage and a complementary lamp operating voltage, the transformer means including a plurality of transformers connected in parallel to the transformer driver and driven in pairs; lamp means including a plurality of lamps, each of the lamps being operated by a corresponding one of the transformers of the transformer means; operation stop control means for detecting a voltage corresponding to current flowing through each of the lamps of the lamp means, determining from the detected voltage whether an open-lamp condition has occurred, detecting a voltage at a midpoint of secondary windings of each of the transformer pairs in the transformer means, determining from the detected voltage whether a fault exists in the transformer means and outputting an operation stop signal upon determining that the open-lamp condition has occurred or that the fault exists in the transformer means; and an output driver for supplying the PWM drive signal to the switch in normal operation and a switch-off signal to the switch upon receiving the operation stop signal from the operation stop control means, respectively.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
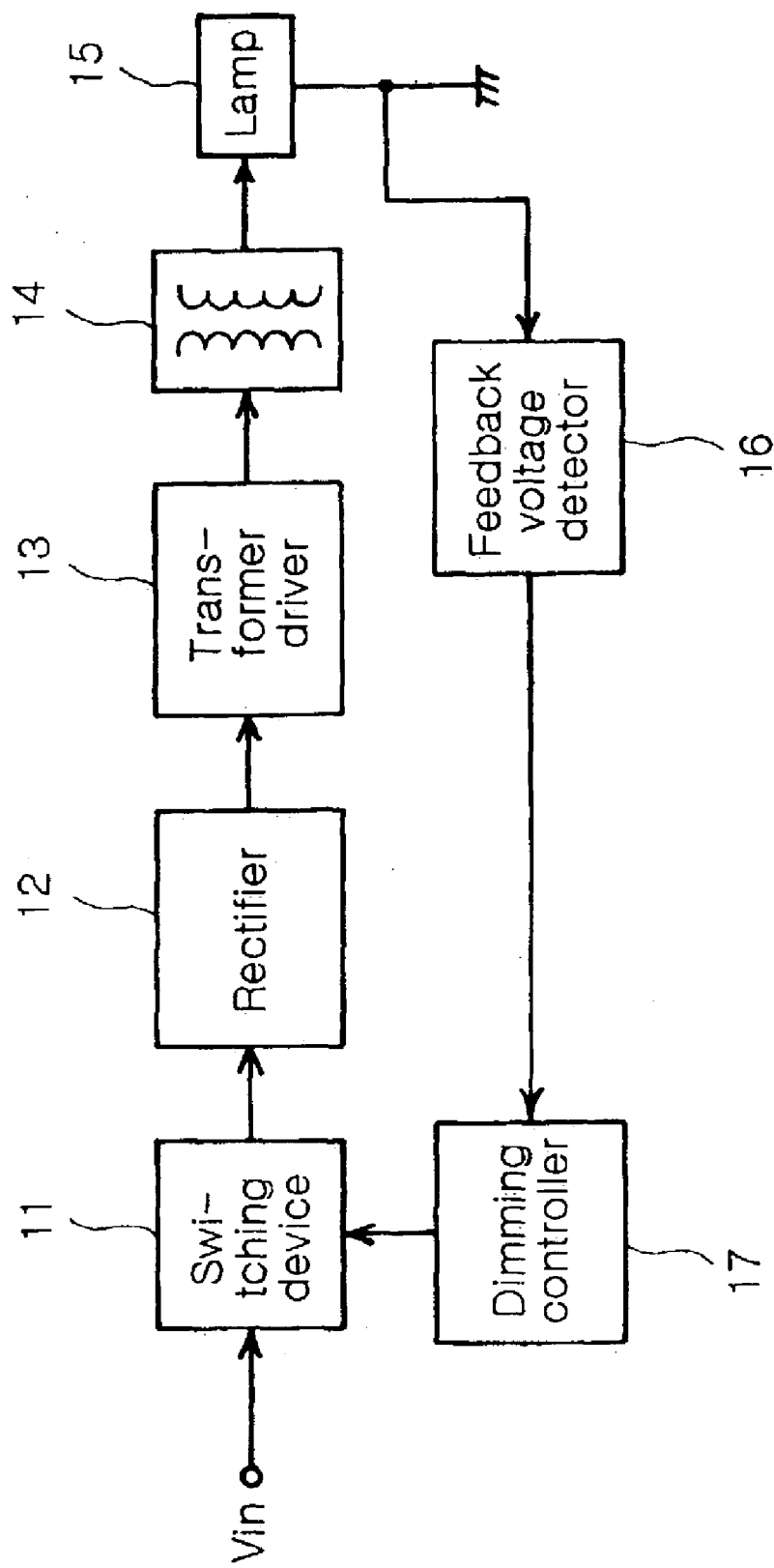
FIG. 1 is a block diagram showing the construction of a general backlight inverter for an LCD panel.
Figure 2:
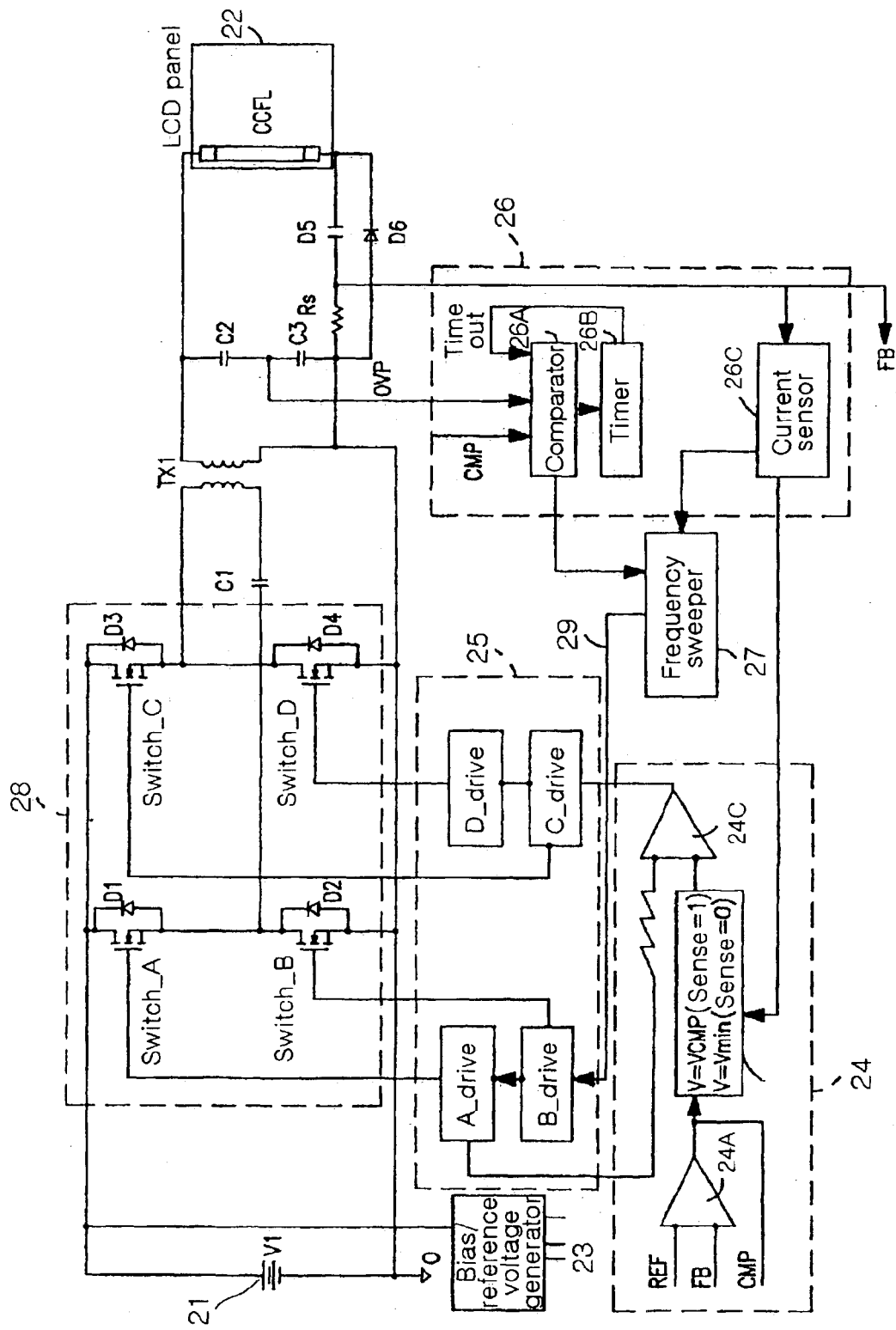
FIG. 2 is a circuit diagram showing the construction of a conventional backlight inverter for an LCD panel.

Now, preferred embodiments of the present invention will be described in detail with reference to the annexed drawings. In the drawings, the same or similar elements are denoted by the same reference numerals even though they are depicted in different drawings.

Figure 3:
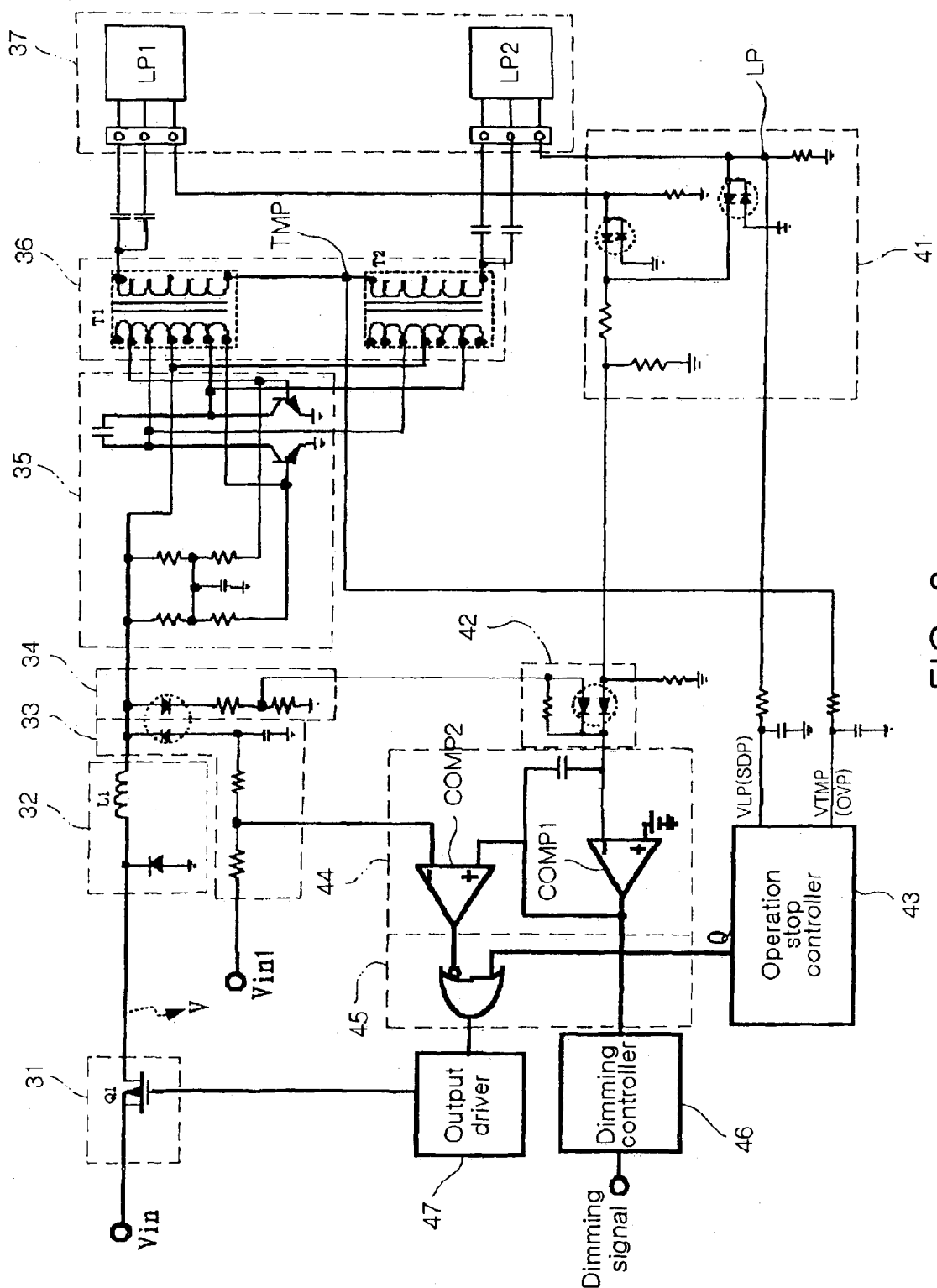
FIG. 3 is a circuit diagram showing the construction of a backlight inverter for an LCD panel in accordance with the present invention.

FIG. 3 is a circuit diagram showing the construction of a backlight inverter for an LCD panel in accordance with the present invention.

With reference to FIG. 3, the backlight inverter according to the present invention comprises a switch 31 for switching a DC operating voltage Vin in response to a PWM drive signal, a rectifier 32 for rectifying an output voltage from the switch 31, a transformer driver 35 for converting an output voltage from the rectifier 32 into an AC voltage, and a transformer device 36 for boosting an output AC voltage from the transformer driver 35 to the levels of a lamp operating voltage and a complementary lamp operating voltage. To this end, the transformer device 36 includes two transformers connected in parallel to the transformer driver 35 and driven in tandem. The present backlight inverter further comprises a lamp device 37 including two lamps LP1 and LP2 each operated by a corresponding one of the transformers of the transformer device 36, an operation stop controller 43 for detecting and recognizing a fault in the transformer device 36 to output an operation stop signal, and an output driver 47 for supplying the PWM drive signal to the switch 31 in normal operation and a switch-off signal to the switch 31 upon receiving the operation stop signal from the operation stop controller 43, respectively.

The present backlight inverter further comprises a reference signal generator 33 for generating a sawtooth-wave reference signal based on the output voltage from the rectifier 32 and a DC input voltage Vin1, an over-voltage detector 34 for detecting the output voltage from the rectifier 32, a lamp voltage detector 41 for detecting a voltage corresponding to current flowing through each of the lamps of the lamp device 37, a voltage selector 42 for selecting a higher one of the voltage detected by the over-voltage detector 34 and the voltage detected by the lamp voltage detector 41, and a comparison circuit 44 including a first comparator COMP1 for comparing the voltage selected by the voltage selector 42 with an internal reference voltage for over-voltage determination and providing a signal indicative of whether an over-voltage has been generated, in accordance with the compared result, and a second comparator COMP2 for comparing an output signal from the first comparator COMP1 with the sawtooth-wave reference signal from the reference signal generator 33 and providing a duty cycle adjustment signal based on the generation of the over-voltage in accordance with the compared result. The present backlight inverter further comprises a logical operation unit 45 for ORing an inverted version of the duty cycle adjustment signal from the comparison circuit 44 and the operation stop signal from the operation stop controller 43 and providing the ORed result to the output driver 47, and a dimming controller 46 for generating a PWM signal in response to a dimming signal based on a brightness control and supplying the generated PWM signal to an output terminal of the first comparator COMP1.

Figure 4:
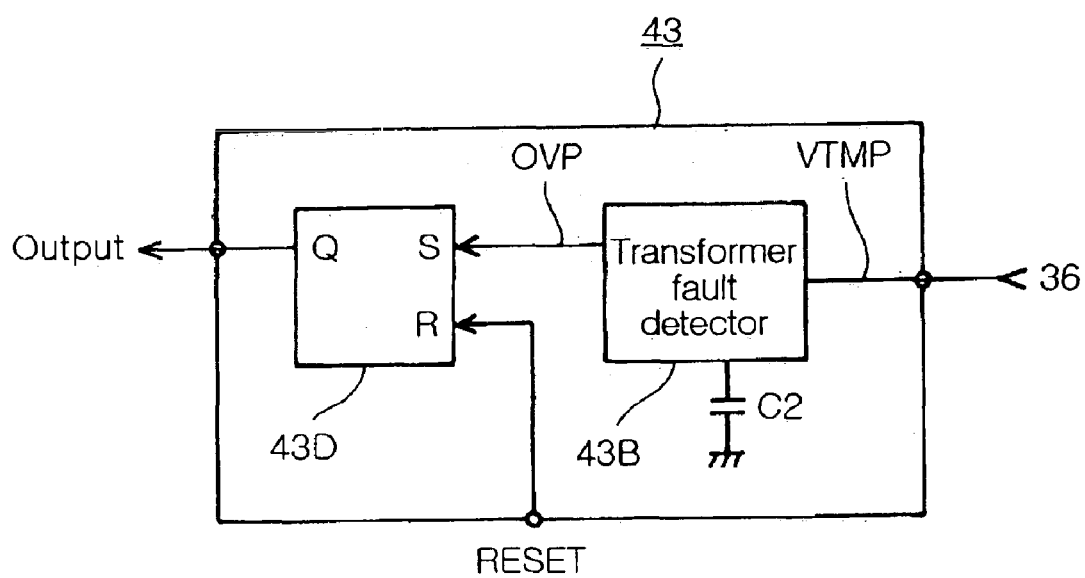
FIG. 4 is a block diagram of a first embodiment of an operation stop controller in FIG. 3.

FIG. 4 is a block diagram of a first embodiment of the operation stop controller 43 in FIG. 3.

With reference to FIG. 4, the operation stop controller 43 is adapted to detect a voltage at a midpoint TMP of secondary windings of the transformer pair in the transformer device 36, determine from the detected voltage whether a fault exists in the transformer device 36, and output the operation stop signal upon determining that the fault exists in the transformer device 36. To this end, the operation stop controller 43 includes a transformer fault detector 43B for detecting the voltage at the midpoint TMP of the secondary windings of the transformer pair in the transformer device 36 and providing a transformer fault signal if the detected voltage is above a reference voltage for determination of the fault in the transformer device 36, and a latch 43D set in response to the transformer fault signal from the transformer fault detector 43B for holding the output of the operation stop signal to the logical operation unit 45 until it is reset.

Figure 5:
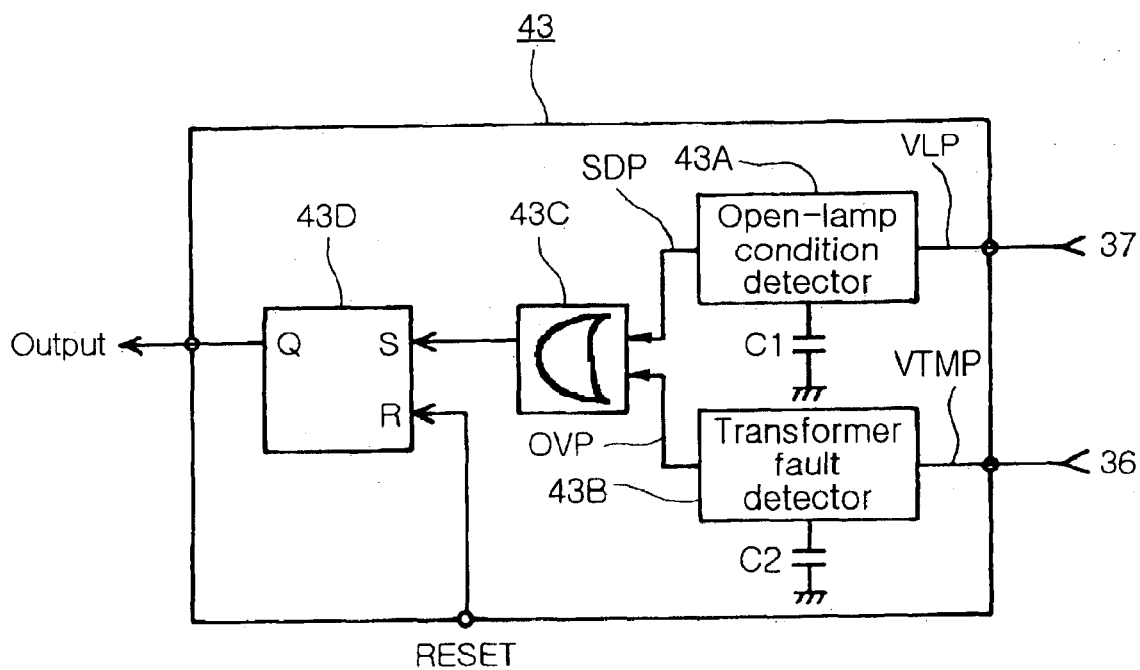
FIG. 5 is a block diagram of a second embodiment of the operation stop controller in FIG. 3.

FIG. 5 is a block diagram of a second embodiment of the operation stop controller 43 in FIG. 3.

With reference to FIG. 5, the operation stop controller, 43 is adapted to detect a voltage corresponding to current flowing through each of the lamps of the lamp device 37, determine from the detected voltage whether an open-lamp condition has occurred, detect a voltage at a midpoint TMP of secondary windings of the transformer pair in the transformer device 36, determine from the detected voltage whether a fault exists in the transformer device 36, and output the operation stop signal upon determining that the open-lamp condition has occurred or that the fault exists in the transformer device 36. To this end, the operation stop controller 43 includes an open-lamp condition detector 43A for detecting the voltage corresponding to the current flowing through each of the lamps of the lamp device 37, determining that the open-lamp condition has occurred if the, detected voltage is below a reference voltage for determination of the open-lamp condition, and then providing an open-lamp condition signal, a transformer fault detector 43B for detecting the voltage at the midpoint TMP of the secondary windings of the transformer pair in the transformer device 36 and providing a transformer fault signal if the detected voltage is above a reference voltage for determination of the fault in the transformer device 36, a malfunction detector 43C for generating a malfunction signal in response to the open-lamp condition signal from the open-lamp condition detector 43A or the transformer fault signal from the transformer fault detector 43B, and a latch 43D set in response to the malfunction signal from the malfunction detector 43C for holding the output of the operation stop signal to the logical operation unit 45 until it is reset.

Figure 6:
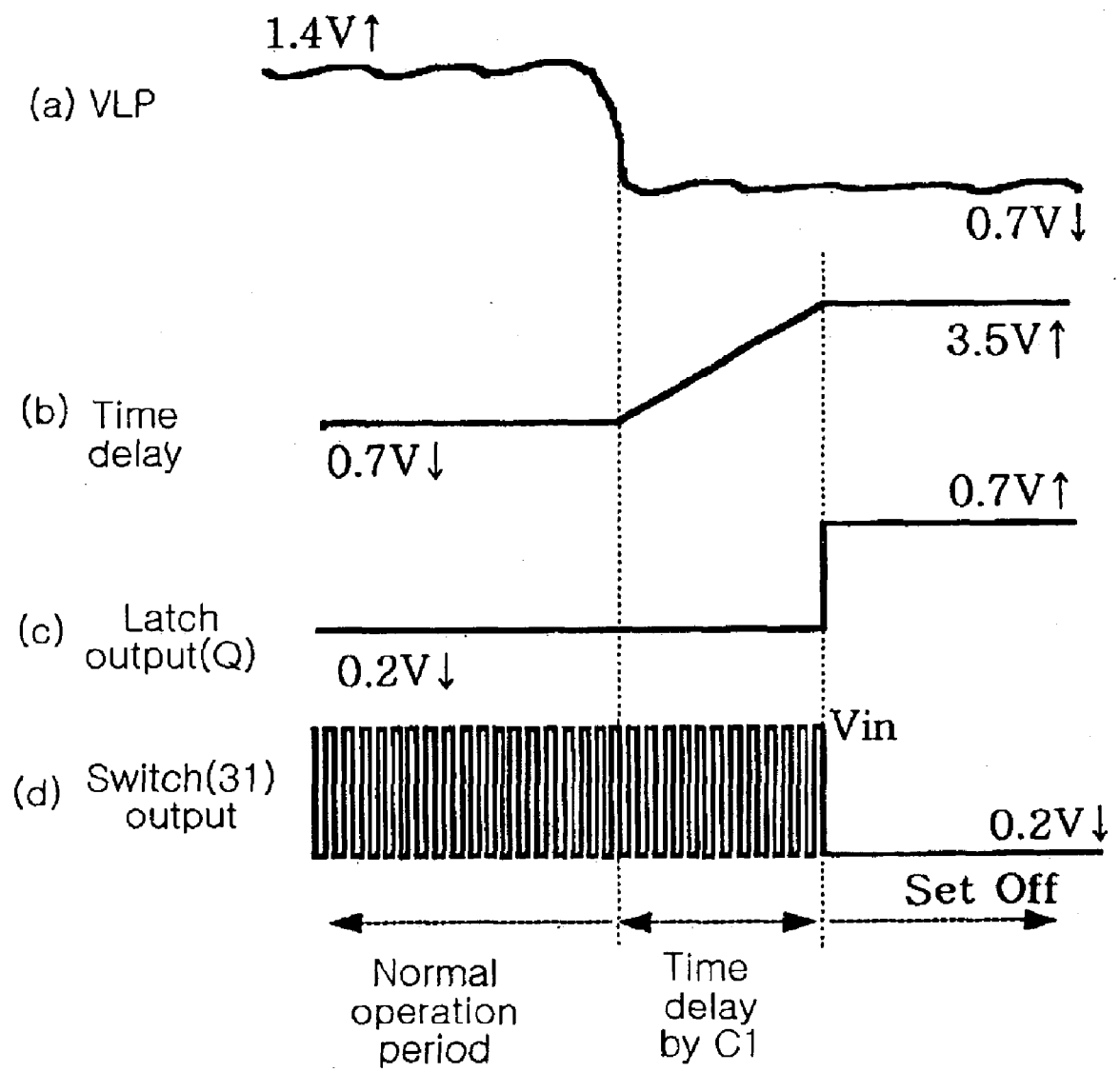
FIGS. 6a to 6d are timing diagrams of a detected lamp voltage and operating voltages in accordance with the present invention.

FIGS. 6a to 6d are timing diagrams of a detected lamp voltage and operating voltages in accordance with the present invention, wherein FIG. 6a shows an input voltage to the open-lamp condition detector 43A, FIG. 6b shows a detection time delayed by a capacitor C1 for time delay, FIG. 6c shows an output voltage from the latch 43D and FIG. 6D shows an output voltage V from the switch 31.

Figure 7:
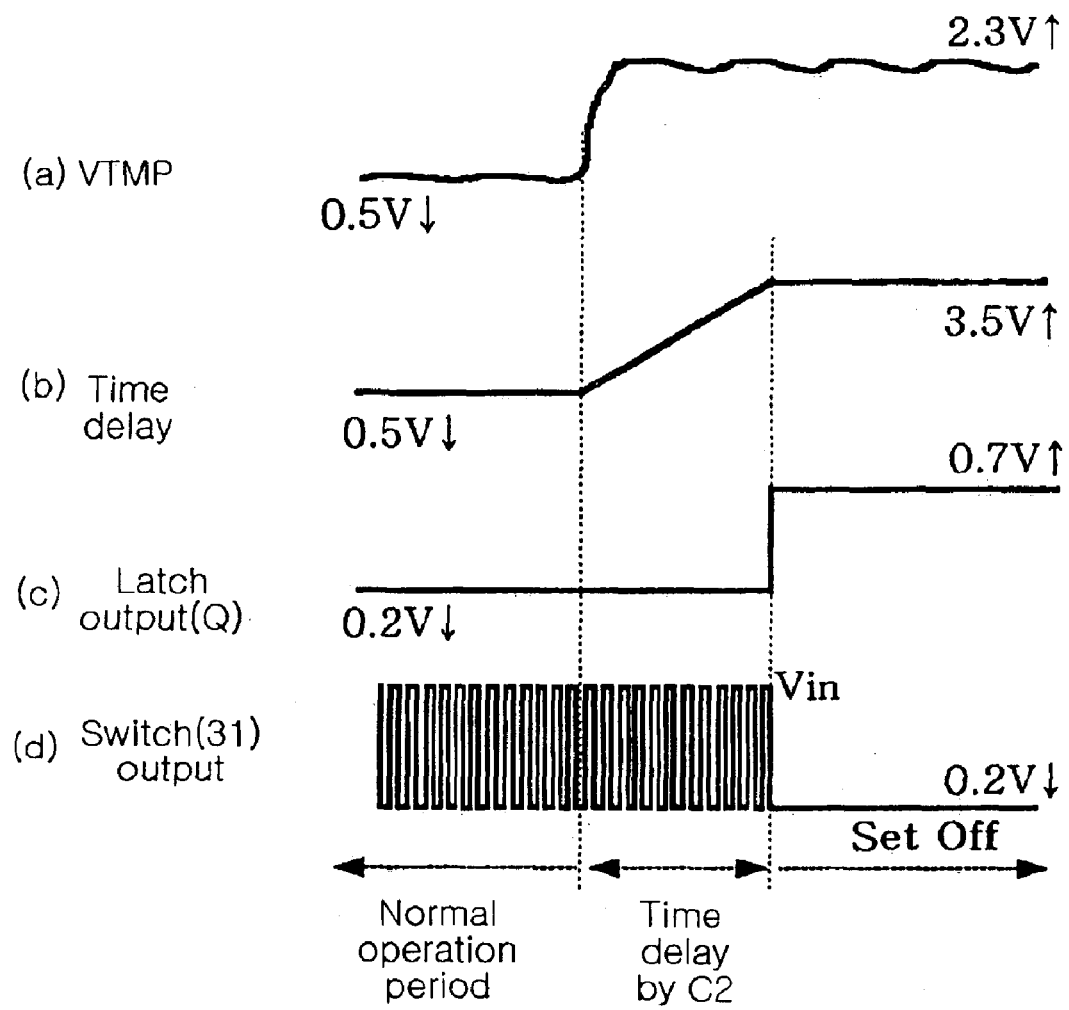
FIGS. 7a to 7d are timing diagrams of a voltage detected at a midpoint of secondary windings of a pair of transformers and operating voltages in accordance with the present invention.

FIGS. 7a to 7d are timing diagrams of a voltage detected at a midpoint of secondary windings of a pair of transformers and operating voltages in accordance with the present invention, wherein FIG. 7a shows an input voltage to the transformer fault detector 43B, FIG. 7b shows a detection time delayed by a capacitor C2 for time delay, FIG. 7c shows an output voltage from the latch 43D and FIG. 7D shows an output voltage V from the switch 31.

Figure 8:
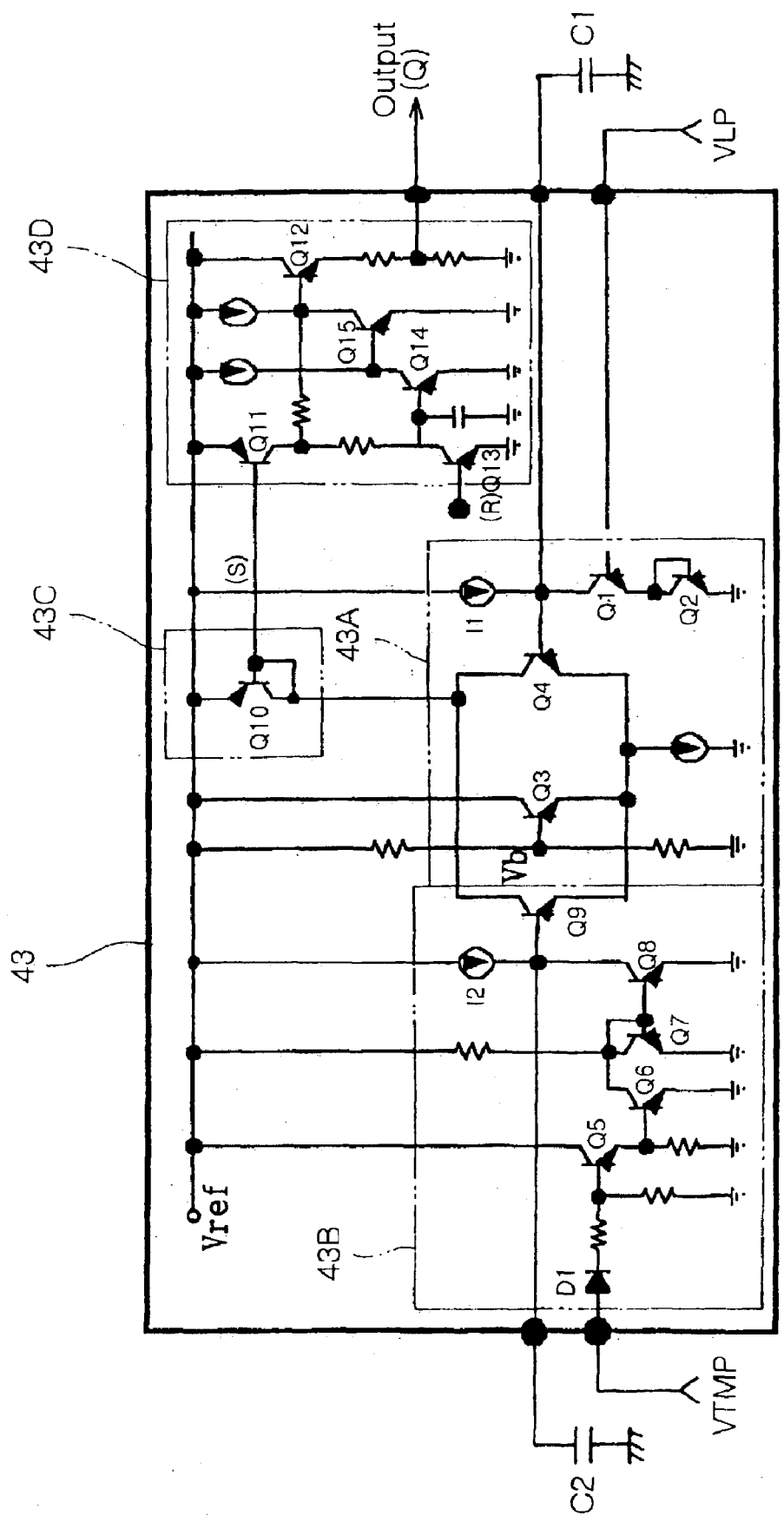
FIG. 8 is a detailed circuit diagram of the second embodiment of the operation stop controller of FIG. 5.

FIG. 8 is a detailed circuit diagram of the second embodiment of the operation stop controller 43 of FIG. 5. It should be noted that FIG. 8 depicts one example of the circuit configuration of the operation stop controller 43 of FIG. 5 and the present invention is not limited thereto.

The operation of the backlight inverter for the LCD panel with the above-stated construction in accordance with the present invention will hereinafter be described in detail with reference to FIGS. 3 to 8.

Referring first to FIG. 3, in the backlight inverter for the LCD panel according to the present invention, the switch 31 switches a DC operating voltage Vin (for example, 5 to 30V) in response to a PWM drive signal to convert it into a square-wave voltage. The rectifier 32 rectifies the square-wave voltage from the switch 31 by half wave. The transformer driver 35 converts an output voltage from the rectifier 32 into an AC voltage, and the pair of transformers in the transformer device 36 boost the AC voltage from the transformer driver 35 to the levels of a lamp operating voltage and a complementary lamp operating voltage and supply the boosted voltages to the lamp device 37 to turn on the corresponding lamps therein.

The reference signal generator 33 of the present inverter generates a sawtooth-wave reference signal based on the output voltage from the rectifier 32 and a DC input voltage Vin1. That is, the input voltage Vin1 is charged on a capacitor through a resistor, and a diode is turned on/off according to the level of the charged voltage and the level of the output voltage from the rectifier 32. The turning-on/off of the diode causes the capacitor to alternately charge and discharge to generate the sawtooth-wave reference signal.

The over-voltage detector 34 detects the output voltage from the rectifier 32, and the lamp voltage detector 41 detects a voltage corresponding to current flowing through each of the lamps of the lamp device 37. Then, the voltage selector 42 selects a higher one of the voltage detected by the over-voltage detector 34 and the voltage detected by the lamp voltage detector 41. Note that the voltage detected by the over-voltage detector 34 is lower than the voltage detected by the lamp voltage detector 41 in normal operation and higher than the voltage detected by the lamp voltage detector 41 in the open-lamp condition.

For example, in the case where, in normal operation, the voltage detected by the over-voltage detector 34 is about 1.5V and the voltage detected by the lamp voltage detector 41 is 2V, the voltage selector 42 selects the detected voltage from the lamp voltage detector 41. Alternatively, in the case where, in the open-lamp condition, the voltage detected by the over-voltage detector 34 is about 7.0V and the voltage detected by the lamp voltage detector 41 is 0.0V, the voltage selector 42 selects the detected voltage from the over-voltage detector 34.

The first comparator COMP1 in the comparison circuit 44 compares the voltage selected by the voltage selector 42 with an internal reference voltage for over-voltage determination and provides a signal indicative of whether an over-voltage has been generated, in accordance with the compared result. For example, in the case where the internal reference voltage for over-voltage determination is set to 4V, the voltage selector 42 selects the detected voltage (2V) from the lamp voltage detector 41 in normal operation and the detected voltage (7V) from the over-voltage detector 34 in abnormal operation (open-lamp condition), as described above. Then, the first comparator COMP1 outputs a difference between the reference voltage (4V) and the input voltage (2V or 7V). The dimming controller 46 generates a PWM signal in response to a dimming signal based on a brightness control and supplies the generated PWM signal to the output terminal of the first comparator COMP1. Then, the second comparator COMP2 compares an output voltage signal from the first comparator COMP1 with the sawtooth-wave reference signal from the reference signal generator 33 and provides a duty cycle adjustment signal based on the over-voltage generation and the PWM signal.

When the lamps are lighted, the lamp operating voltage and the complementary lamp operating voltage, namely, the two voltages having a phase difference of 180 degrees therebetween offset each other at the midpoint TMP of the secondary windings of the pair of transformers in the transformer device 36, so a voltage close to zero appears at the midpoint TMP. However, in the case where a poor connection is present inside or outside of the transformer device 36, the voltage balance is broken, thereby causing an instantaneously high voltage to be generated in any one of the transformers. In this case, a certain voltage is undesirably generated at the midpoint TMP.

If the lamp operating voltage and the complementary lamp operating voltage are supplied respectively to the lamps, for example, CCFLs, LP1 and LP2 under the condition that the lamps LP1 and LP2 are connected respectively to connectors LCONT1 and LCONT2 of the lamp device 37, then currents flow in the corresponding lamps to turn them on. In this case, certain currents flow through ground lines GL1 and GL2 of the connectors LCONT1 and LCONT2. Provided that any one of the lamps is open (removed), little current will flow through a corresponding one of the ground lines GL1 and GL2.

Meanwhile, the operation stop controller 43 of the present inverter detects and recognizes a fault in the transformer device 36 to output an operation stop signal. Now, a detailed description will be given of the operation stop controller 43 with reference to FIGS. 4 and 5.

In the first embodiment of the present invention, the operation stop controller 43 detects a voltage at the midpoint TMP of the secondary windings of the transformer pair in the transformer device 36, determines from the detected voltage whether a fault exists in the transformer device 36, and outputs the operation stop signal upon determining that the fault exists in the transformer device 36, as will hereinafter be described with reference to FIG. 4.

Referring to FIG. 4, the transformer, fault detector 43B of the operation stop controller 43 detects the voltage at the midpoint TMP of the secondary windings of the transformer pair in the transformer device 36 and provides a transformer fault signal if the detected voltage is above a reference voltage for determination of a fault in the transformer device 36. For example, a certain voltage (for example, 4V) appears at the midpoint TMP in the event of a, fault in the transformer device, such as a poor connection as stated previously, whereas the voltage VTMP at the midpoint TMP is close to zero in normal operation. In this case, if the reference voltage for the transformer fault determination is set to about 2V, the transformer fault detector 43B outputs the transformer fault signal (high (H) signal) upon determining that the fault is present in the transformer device 36, and a low (L) signal, otherwise. Then, the latch 43D is set in response to the transformer fault signal from the transformer fault detector 43B to hold the output of the operation stop signal to the logical operation unit 45 until it is reset.

In the second embodiment of the present invention, the operation stop controller 43 detects a voltage corresponding to current flowing through each of the lamps of the lamp device 37, determines from the detected voltage whether an open-lamp condition has occurred, detects a voltage at the midpoint TMP Of the secondary windings of the transformer pair in the transformer device 36, determines from the detected voltage whether a fault exists in the transformer device 36, and outputs the operation stop signal upon determining that the open-lamp condition has occurred or that the fault exists in the transformer device 36, as will hereinafter be described with reference to FIG. 5.

Referring to FIG. 5, the open-lamp condition detector 43A of the operation stop controller 43 detects the voltage VLP (for example, 3V in normal operation and 0V in abnormal operation) corresponding to the current flowing through each of the lamps of the lamp device 37, determines that the open-lamp condition has occurred if the detected voltage is below a reference voltage (for example, 1V) for determination of the open-lamp condition, and then provides an open-lamp condition signal (for example, H signal). The transformer fault detector 43B of the operation stop controller 43 detects the voltage VTMP at the midpoint TMP of the secondary windings of the transformer pair in the transformer device 36 and provides a transformer fault signal if the detected voltage is above a reference voltage for determination of a fault in the transformer device 36, as stated previously. The malfunction detector 43C generates a malfunction signal in response to the open-lamp condition signal (H signal) from the open-lamp condition detector 43A or the transformer fault signal (H signal) from the transformer fault detector 43B. Then, the latch 43D of the operation stop controller 43 is set in response to the malfunction signal (H signal) from the malfunction detector 43C to hold the output of the operation stop signal (H signal) to the logical operation unit 45 until it is reset.

Referring to FIG. 8 which is the detailed circuit diagram of the second embodiment of the operation stop controller 43 of FIG. 5, the voltage VLP (for example, 3V in normal operation and 0V in abnormal operation) corresponding to the current flowing through each of the lamps of the lamp device 37 is inputted to the open-lamp condition detector 43A of the operation stop controller 43. For example, in the case where the voltage of 0V in abnormal operation is inputted, transistors Q1 and Q2 in the open-lamp condition detector 43A are turned off, thereby causing the capacitor C1 to be fully charged with current I1. At the time that a voltage charged on the capacitor C1 exceeds a voltage Vb, a transistor Q4 is turned on and a transistor Q10 in the malfunction detector 43C is in turn turned on. As a result, transistors Q11 and Q12 in the latch 43D are sequentially turned on to provide the operation stop signal at an output terminal Q.

On the other hand, the voltage VTMP (low in normal operation and high in abnormal operation) at the midpoint TMP of the secondary windings of the transformer pair in the transformer device 36 is inputted to the transformer fault detector 43B of the operation stop controller 43. For example, in the case where the high voltage in abnormal operation is inputted, a diode D1 and transistor Q5 in the transformer fault detector 43B are turned on, so a transistor Q8 is turned off, thereby causing the capacitor C2 to be fully charged with current I2. At the moment that a voltage charged on the capacitor C2 exceeds the voltage Vb, a transistor Q9 is turned on and the transistor Q10 in the malfunction detector 43C is thus turned on. As a result, the two transistors Q11 and Q12 in the latch 43D are sequentially turned on to provide the operation stop signal at the output terminal Q.

In this manner, as shown in the detailed circuit diagram of FIG. 8, the operation stop controller 43 provides the operation stop signal upon detecting an open-lamp condition or a fault in the transformer device. On the other hand, if a reset signal (H) is inputted to a reset terminal RESET, transistors Q13 to Q15 are turned on, so the base voltage of the transistor Q12 becomes a ground level. As a result, the output terminal Q becomes the ground level, thereby causing the operation stop controller 43 to be reset.

While the operation stop controller 43 according to the first and second embodiments of the present invention outputs the operation stop signal as stated above, the switch 31 stops its output in response to the operation stop signal, as will hereinafter be described in detail.

The logical operation unit 45 of the present inverter ORes an inverted version (PWM signal) of the duty cycle adjustment signal from the comparison circuit 44 and the operation stop signal (H) from the operation stop controller 43 and provides the ORed result to the output driver 47. For example, in normal operation, the output of the operation stop controller 43 is low (L), so the logical operation unit 45 outputs the inverted version (PWM signal) of the duty cycle adjustment signal to the output driver 47. Alternatively, upon receiving the operation stop signal (H signal) from the operation stop controller 43, the logical operation unit 45 continuously outputs a high (H) signal to the output driver 47. That is, the logical operation unit 45 supplies a switch-off signal to the switch 31 in response to the operation stop signal which is continuously kept high in level, whereas it supplies the PWM signal to the switch 31 in response to the inverted version of the duty cycle adjustment signal.

The present invention as described above is applicable to computers, printers and any other devices including LCDs.

As apparent from the above description, the present invention provides a backlight inverter for an LCD panel which is capable of detecting a fault in a transformer device including two transformers driven in tandem or an open-lamp condition and performing a control operation to stop its operation upon detecting the fault in the transformer device or the open-lamp condition. Therefore, an enhanced self-protection function can be carried out in the event of a malfunction, such as the fault in the transformer device or the open-lamp condition, to more securely prevent the internal components and circuits of the inverter from being damaged due to such a malfunction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A backlight inverter for an LCD panel comprising:
a switch for switching a direct current (DC) operating voltage in response to a pulse width modulation (PWM) drive signal;
a rectifier for rectifying an output voltage from said switch;
a transformer driver for converting an output voltage from said rectifier into an alternating current (AC) voltage;
a plurality of transformers for boosting the AC voltage outputted from said transformer driver to levels of a lamp operating voltage and a complementary lamp operating voltage, said transformers being connected in parallel to said transformer driver and driven in pairs;
a plurality of lamps each being operated by a corresponding one of said transformers;
an operation stop control for detecting a voltage at a midpoint of secondary windings of each of said transformer pairs, determining from the detected voltage whether a fault exists in said transformers and outputting an operation stop signal upon determining that the fault exists in said transformers;
an output driver for supplying said PWM drive signal to said switch in normal operation and a switch-off signal to said switch upon receiving said operation stop signal from said operation stop control;
a reference signal generator for generating a sawtooth-wave reference signal based on said output voltage from said rectifier and a DC input voltage;
an over-voltage detector for detecting said output voltage from said rectifier;
a lamp voltage detector for detecting a voltage corresponding to a current flowing through each of said lamps;
a voltage selector for selecting a higher one of the voltage detected by said over-voltage detector and the voltage detected by said lamp voltage detector;
a first comparator for comparing the voltage selected by said voltage selector with an internal reference voltage for over-voltage detection and, based on a result of said comparing, outputting a signal indicative of whether an over-voltage condition has been detected;
a second comparator for comparing the signal outputted from said first comparator with said sawtooth-wave reference signal from said reference signal generator and providing a duty cycle adjustment signal in response to the signal outputted from said first comparator; and
a logical operation unit for ORing an inverted version of said duty cycle adjustment signal from said second comparator and said operation stop signal from said operation stop control and providing the ORed result to said output driver.

2. The backlight inverter as set forth in claim 1, further comprising a dimming controller for generating a PWM signal in response to a dimming signal based on a brightness control and supplying the generated PWM signal to an output terminal of said first comparator.

3. The backlight inverter as set forth in claim 1, wherein said operation stop control includes:

a transformer fault detector for detecting said voltage at said midpoint of said secondary windings of each of said transformer pairs and providing a transformer fault signal if the detected voltage is above a reference voltage for transformer fault detection; and a latch set in response to said transformer fault signal from said transformer fault detector for holding the output of said operation stop signal to said logical operation unit until said latch is reset.

4. A backlight inverter for an LCD panel, comprising:

a switch for switching a direct current (DC) operating voltage in response to a pulse width modulation (PWM) drive signal;

a rectifier for rectifying an output voltage from said switch;

a transformer driver for converting an output voltage from said rectifier into an alternating current (AC) voltage;

a plurality of transformers for boosting the AC voltage outputted from said transformer driver to levels of a lamp operating voltage and a complementary lamp operating voltage, said transformers being connected in parallel to said transformer driver and driven in pairs;

a plurality of lamps each being operated by a corresponding one of said transformers;

an operation stop control for detecting a voltage corresponding to a current flowing through each of said lamps, determining from the detected voltage whether an open-lamp condition has occurred, detecting a voltage at a midpoint of secondary windings of each of said transformer pairs, determining from the detected voltage at said midpoint whether a fault exists in said transformers, and outputting an operation stop signal upon determining that the open-lamp condition has occurred or that the fault exists in said transformers; and an output driver for supplying said PWM drive signal to said switch in normal operation and a switch-off signal to said switch upon receiving said operation stop signal from said operation stop control;

a reference signal generator for generating a sawtooth-wave reference signal based on said output voltage from said rectifier and a DC input voltage;

an over-voltage detector for detecting said output voltage from said rectifier;

a lamp voltage detector for detecting the voltage corresponding to the current flowing through each of said lamps;

a voltage selector for selecting a higher one of the voltage detected by said over-voltage detector and the voltage detected by said lamp voltage detector;

a first comparator for comparing the voltage selected by said voltage selector with an internal reference voltage for over-voltage detection and, based on a result of said comparing, outputting a signal indicative of whether an over-voltage condition has been detected;

a second comparator for comparing the signal outputted from said first comparator with said sawtooth-wave reference signal from said reference signal generator and providing a duty cycle adjustment signal in response to the signal outputted from said first comparator; and a logical operation unit for ORing an inverted version of said duty cycle adjustment signal from said second comparator and said operation stop signal from said operation stop control and providing the ORed result to said output driver.

5. The backlight inverter as set forth in claim 4, further comprising a dimming controller for generating a PWM signal in response to a dimming signal based on a brightness control and supplying the generated PWM signal to an output terminal of said first comparator.

6. The backlight inverter as set forth in claim 4, wherein said operation stop control includes:

an open-lamp condition detector for detecting said voltage corresponding to said current flowing through each of said lamps, determining that the open-lamp condition has occurred if the detected voltage is below a reference voltage for open-lamp condition detection, and then providing an open-lamp condition signal;

a transformer fault detector for detecting said voltage at said midpoint of said secondary windings of each of said transformer pairs and providing a transformer fault signal if the detected voltage is above a reference voltage for transformer fault detection;

a malfunction detector for generating a malfunction signal in response to said open-lamp condition signal from said open-lamp condition detector or said transformer fault signal from said transformer fault detector; and a latch set in response to said malfunction signal from said malfunction detector for holding the output of said operation stop signal to said logical operation unit until said latch is reset.

7. A backlight inverter for an LCD panel, comprising:

a switch for switching a direct current (DC) operating voltage in response to a pulse width modulation (PWM) drive signal;

a rectifier coupled to said switch for rectifying an output voltage from said switch;

a transformer driver coupled to said rectifier for converting an output voltage from said rectifier into an alternating current (AC) voltage;

at least a pair of transformers connected in parallel to said transformer driver for boosting the AC voltage outputted from said transformer driver to levels suitable for operation of lamps each being operated by a corresponding one of said transformers;

an operation stop control for detecting at least one of a fault in said transformers and an open-lamp condition, and for outputting an operation stop signal upon determining that either a fault exists in said transformers of an open-lamp condition has occurred;

an output driver coupled to said switch, and said operation stop control for supplying said PWM drive signal to said switch in normal operation and a switch-off signal to said switch upon receiving said operation stop signal;

a reference signal generator coupled to said rectifier for generating a reference signal based on said output voltage from said rectifier;

an overvoltage detector for detecting said output voltage from said rectifier;

a lamp voltage detector for detecting a voltage corresponding to a current flowing through each of said lamps;

a voltage selector coupled to said overvoltage detector and said lamp voltage detector for selecting a higher one of the voltage detected by said overvoltage detector and the voltage detected by said lamp voltage detector;

a first comparator coupled to said voltage selector for comparing the voltage selected by said voltage selector with an overvoltage detection reference voltage and outputting a comparison signal indicative of whether an overvoltage condition has been detected;

a second comparator coupled to said first comparator and said reference signal generator for comparing the comparison signal with said reference signal and outputting a duty cycle adjustment signal; and a logic coupled to said second comparator, said output driver and said operation stop control for outputting either said duty cycle adjustment signal or said operation stop signal to said output driver depending on a level of said operation stop signal.

8. The backlight inverter of claim 7, wherein said reference signal is a sawtooth-wave signal.

9. The backlight inverter of claim 8, wherein said logic is an OR logic.

10. The backlight inverter of claim 9, wherein an output of said second comparator is coupled to an inverted input of said OR logic.

11. The backlight inverter of claim 10, further comprising a dimming controller for generating a PWM signal in response to a dimming signal and supplying the generated PWM signal to an output terminal of said first comparator.

12. The backlight inverter of claim 10, wherein said operation stop control includes:

a transformer fault detector coupled to a midpoint of secondary windings of said transformer pair for detecting a voltage at said midpoint and providing a transformer fault signal if the detected voltage at said midpoint is above a transformer fault detection reference voltage; and a latch coupled to said logic and said transformer fault detector and being set in response to said transformer fault signal for holding the output of said operation stop signal to said logic until said latch is reset.

13. The backlight inverter of claim 10, wherein said operation stop control includes:

an open-lamp condition detector for detecting said voltage corresponding to said current flowing through each of said lamps and providing an open-lamp condition signal if the detected voltage is below an open-lamp condition detection reference voltage; and a latch coupled to said logic and said open-lamp condition detector and being set in response to said open-lamp condition signal for holding the output of said operation stop signal to said logic until said latch is reset.

14. The backlight inverter of claim 10, wherein said operation stop control includes:

an open-lamp condition detector for detecting said voltage corresponding to said current flowing through each of said lamps and providing an open-lamp condition signal if the detected voltage is below an open-lamp condition detection reference voltage;

a transformer fault detector coupled to a midpoint of secondary windings of said transformer pair for detecting a voltage at said midpoint and providing a transformer fault signal if the detected voltage at said midpoint is above a transformer fault detection reference voltage;

a malfunction detector coupled to said transformer fault detector and said open-lamp condition detector for generating a malfunction signal in response to either said open-lamp condition signal or said transformer fault signal; and a latch coupled to said logic and said malfunction detector and being set in response to said malfunction signal for holding the output of said operation stop signal to said logic until said latch is reset.

15. The backlight inverter of claim 7, wherein said operation stop control includes:

a transformer fault detector coupled to a midpoint of secondary windings of said transformer pair for detecting a voltage at said midpoint and providing a transformer fault signal if the detected voltage at said midpoint is above a transformer fault detection reference voltage; and a latch coupled to said logic and said transformer fault detector and being set in response to said transformer fault signal for holding the output of said operation stop signal to said logic until said latch is reset.

16. The backlight inverter of claim 7, wherein said operation stop control includes:

an open-lamp condition detector for detecting said voltage corresponding to said current flowing through each of said lamps and providing an open-lamp condition signal if the detected voltage is below an open-lamp condition detection reference voltage; and a latch coupled to said logic and said open-lamp condition detector and being set in response to said open-lamp condition signal for holding the output of said operation stop signal to said logic until said latch is reset.

17. The backlight inverter of claim 7, wherein said operation stop control includes:

an open-lamp condition detector for detecting said voltage corresponding to said current flowing through each of said lamps and providing an open-lamp condition signal if the detected voltage is below an open-lamp condition detection reference voltage;

a transformer fault detector coupled to a midpoint of secondary windings of said transformer pair for detecting a voltage at said midpoint and providing a transformer fault signal if the detected voltage at said midpoint is above a transformer fault detection reference voltage;

a malfunction detector coupled to said transformer fault detector and said open-lamp condition detector for generating a malfunction signal in response to either said open-lamp condition signal or said transformer fault signal; and a latch coupled to said logic and said malfunction detector and being set in response to said malfunction signal for holding the output of said operation stop signal to said logic until said latch is reset.

* * * * *